US010760989B2

(12) United States Patent
Keeter

(10) Patent No.: US 10,760,989 B2
(45) Date of Patent: Sep. 1, 2020

(54) SUBMERSIBLE TRANSDUCER CONFIGURED TO IMPEDE FLUID PENETRATION

(71) Applicant: TE CONNECTIVITY CORPORATION, Berwyn, PA (US)

(72) Inventor: Steven Mark Keeter, Newport News, VA (US)

(73) Assignee: TE CONNECTIVITY CORPORATION, Berwyn, PA (US)

(*) Notice: Subject to any disclaimer, the term of this patent is extended or adjusted under 35 U.S.C. 154(b) by 261 days.

(21) Appl. No.: 15/981,218

(22) Filed: May 16, 2018

(65) Prior Publication Data

US 2019/0353545 A1    Nov. 21, 2019

(51) Int. Cl.
*G01L 9/00*    (2006.01)
*G01L 19/00*    (2006.01)
(Continued)

(52) U.S. Cl.
CPC ........ *G01L 9/0044* (2013.01); *G01L 19/0084* (2013.01); *H01B 3/302* (2013.01);
(Continued)

(58) Field of Classification Search
CPC . G01L 9/0044; G01L 19/0084; G01L 9/0055; H01B 3/302; H01B 7/0009;
(Continued)

(56) References Cited

U.S. PATENT DOCUMENTS 4,335,608 A * 6/1982 Wood ..................... G01F 23/18
174/19
4,878,297 A    11/1989 Vories
(Continued)

FOREIGN PATENT DOCUMENTS

| CN | 203672552 U | 6/2014 |
|---|---|---|
| CN | 105203255 A | 12/2015 |
| JP | S56128422 A | 10/1981 |

OTHER PUBLICATIONS

European Search Report in corresponding European Application No. 19173746; total 10 pages.
(Continued)

*Primary Examiner* — Freddie Kirkland, III

(57) ABSTRACT

Submersible transducer includes a transducer housing configured to be submerged within an aqueous liquid and a pressure sensor operable to obtain data for determining a pressure of the aqueous liquid. The pressure sensor may be disposed within the transducer housing. The submersible transducer also includes a submersible cable having an electrical conductor and a venting tube operably coupled to the pressure sensor. The pressure sensor uses an atmospheric pressure of an external environment that is detected through the venting tube to determine the pressure of the aqueous liquid. The submersible cable also includes a cable jacket and an inner layer that is surrounded by the cable jacket. The inner layer surrounds the electrical conductor and the venting tube. The inner layer includes a non-hygroscopic polymer that is more resistant to absorbing the aqueous liquid than the cable jacket.

20 Claims, 3 Drawing Sheets

(51) Int. Cl.
*H01B 3/30* (2006.01)
*H01B 7/00* (2006.01)
*H01B 7/14* (2006.01)
*H01B 7/24* (2006.01)
*H01B 7/282* (2006.01)
*H01B 3/42* (2006.01)
*H01B 3/44* (2006.01)

(52) U.S. Cl.
CPC ........... *H01B 7/0009* (2013.01); *H01B 7/145* (2013.01); *H01B 7/24* (2013.01); *H01B 7/282* (2013.01); *G01L 9/0055* (2013.01); *H01B 3/305* (2013.01); *H01B 3/427* (2013.01); *H01B 3/441* (2013.01); *H01B 3/443* (2013.01); *H01B 3/446* (2013.01)

(58) Field of Classification Search
CPC .......... H01B 7/145; H01B 7/24; H01B 7/282; H01B 3/305; H01B 3/427; H01B 3/441; H01B 3/443; H01B 3/446; H01B 7/0072; B32B 2597/00; B32B 2457/00; B32B 7/02; B32B 7/08; B32B 1/08; B32B 2307/728; G01F 23/14
See application file for complete search history.

(56) References Cited

U.S. PATENT DOCUMENTS

| | | | | |
|---|---|---|---|---|
| 5,033,297 | A | * | 7/1991 | Gustafson ............... E21B 47/01 439/279 |
| 5,072,073 | A | * | 12/1991 | Becker ................... H02G 1/145 156/48 |
| 5,857,714 | A | | 1/1999 | Gustafson |
| 6,349,161 | B1 | | 2/2002 | Gleason et al. |
| 6,528,730 | B2 | | 3/2003 | Persson |
| 6,677,861 | B1 | | 1/2004 | Henry et al. |
| 6,928,864 | B1 | | 8/2005 | Henry et al. |
| 7,832,295 | B2 | | 11/2010 | Rodriguez et al. |
| 7,936,957 | B1 | | 5/2011 | Puzan et al. |
| 9,227,279 | B2 | | 1/2016 | Padgett, Jr. |
| 2009/0242194 | A1 | | 10/2009 | Varkey et al. |
| 2010/0186990 | A1 | * | 7/2010 | Neuroth ................. H01B 7/045 174/120 AR |
| 2013/0033830 | A1 | | 2/2013 | Eckhardt et al. |
| 2017/0287595 | A1 | * | 10/2017 | Holzmueller ........... F04B 17/03 |
| 2019/0164670 | A1 | * | 5/2019 | Holzmueller .......... H01B 13/14 |
| 2019/0234788 | A1 | * | 8/2019 | Norris ...................... G05D 9/12 |

OTHER PUBLICATIONS

Asahi Kasei Corporation. "Clear Styrenic Block Copolymer." Aug. 2019. https://www.akelastomer.com/eng/brochures/afx_eng.pdf. Retrieved on Sep. 19, 2019; total 19 pages.
Sunray, Inc. "Polyurethane Technical Data." https://www.sunray-inc.com/technical-data/. Retrieved on Sep. 19, 2019; total 4 pages.
"Standard Test Method for Water Absorption of Plastics" American Society for Testing and Materials International Designation: D570-98; 2005; 4 pages.
"Series SBLTX Submersible Level Transducer; Specifications—Instillation and Operating Instructions" Mercoid Division, Dwyer Instruments, Inc; Bulletin L-37; 2015; 4 pages.
"Series SBLT2 & SBLT | Mercoid Submersible Level Transmitters" Dwyer Instruments, Inc.; 2 pages.
"S12S Submersible Level Transmitter with Silicon Sensor and SDI-12" Impress Sensors & Systems, Ltd.; 3 pages.

\* cited by examiner

SUBMERSIBLE TRANSDUCER CONFIGURED TO IMPEDE FLUID PENETRATION

BACKGROUND

The subject matter relates generally to transducers that are configured to be fully submerged within a liquid and connected to the external environment through a cable.

Submersible transducers are used to monitor conditions or qualities of a liquid. Submersible transducers may include a housing where a sensor is held and a cable that provides a communication line and power supply for the sensor. For submersible pressure transducers, the sensor is a pressure sensor and the cable may, optionally, include a venting tube for detecting an atmospheric pressure of the external environment. Submersible pressure transducers may be used to monitor ground-water levels in aquifers or deep wells, waste-water levels at different stages of treatment, and surface-water levels in canals or tanks. Other liquids that may be monitored by submersible transducers include industrial chemicals, natural gas liquids (NGLs), and corn oil.

Submersible transducers are often located within the liquid for an extended period of time (e.g., days, weeks, months or years) and can experience extreme conditions, such as extreme pressures and temperatures. For these reasons, submersible transducers can be vulnerable to fluid penetration, which can affect measurements and lead to transducer failure. The monitored liquid can penetrate the submersible transducer by seeping through interfaces where the cable and housing connect. Moisture in the external environment can condense within the venting tube or within the housing. In addition, the cable jacket for submersible pressure transducers is often polyurethane. Polyurethane has a relatively high water-absorption rate relative to other materials.

To minimize fluid penetration through the interfaces, manufacturers have used O-rings, welded seals, potting material, sealed strain-relief, and cable glands. In some transducers, the housing that surrounds the sensor may be disposed within a separate outer housing. Desiccants and water-resistant gels and tapes have also been disposed within the housing to increase the life span of the submersible transducer. For transducers that utilize venting tubes, desiccant cartridges, polytetrafluoroethylene (PTFE) hydrophobic membranes, and aneroid bellows can be connected to the venting tubes. To minimize fluid ingress through the cable jacket, manufacturers have used water-absorbing tape and silicone gels along a length of the cable. Such fillers, however, add cost and complexity to the manufacturing process. Although the above methods can be effective, fluid penetration remains a challenge and, in many cases, is the primary reason for a shortened life span.

Accordingly, there is a need for a submersible transducer that impedes fluid penetration.

BRIEF DESCRIPTION

In an embodiment, a submersible transducer is provided that includes a transducer housing configured to be submerged within an aqueous liquid and a pressure sensor operable to obtain data for determining a pressure of the aqueous liquid. The pressure sensor may be disposed within the transducer housing. The submersible transducer also includes a submersible cable having an electrical conductor and a venting tube operably coupled to the pressure sensor. The pressure sensor uses an atmospheric pressure of an external environment that is detected through the venting tube to determine the pressure of the aqueous liquid. The submersible cable also includes a cable jacket and an inner layer that is surrounded by the cable jacket. The inner layer surrounds the electrical conductor and the venting tube. The inner layer includes a non-hygroscopic polymer that is more resistant to absorbing the aqueous liquid than the cable jacket.

In some embodiments, the inner layer consists essentially of the non-hygroscopic polymer. In more particular embodiments, the inner layer consists of the non-hygroscopic polymer.

In some aspects, a water-absorption percentage of the non-hygroscopic polymer is at most 0.01% and a water-absorption percentage of the cable jacket is at least 0.1%.

In some aspects, a water-absorption percentage of the cable jacket is at least ten times (10×) a water-absorption percentage of the non-hygroscopic polymer. The water-absorption percentage can be determined using International Organization for Standardization (ISO) 62:2008 or ASTM D570-98(2010)e1. For example, the water-absorption percentages may be obtained in accordance with ASTM D570-98(2010)e1 when the two layers are submerged in distilled water at 23° C. for two weeks (14 days). As another example, the water-absorption percentages may be obtained in accordance with ASTM D570-98(2010)e1 when the two layers are submerged in distilled water at 23° C. until saturation. The two layers used as test specimens have the same compositions as the inner and outer layers in the submersible cable. The specimens may be, for example, a disk having a designated thickness (e.g., between 0.2 mm and 1.0 mm).

In some aspects, the inner layer is a first sub-layer and the cable jacket is a second sub-layer. The first and second sub-layers form a co-extruded layer in which the first and second sub-layers are distinct but inseparable portions of the co-extruded layer.

In some aspects, the cable jacket comprise polyurethane and has an exterior matte finish.

In some aspects, the electrical conductor is one of a plurality of the electrical conductors. The electrical conductors are distributed circumferentially about the venting tube. The submersible transducer also includes a shielding layer that surrounds and groups together the electrical conductors and the venting tube.

In some aspects, the submersible transducer also includes a strain-relief section that covers a portion of the transducer housing and the cable jacket.

In some aspects, the pressure sensor includes a diaphragm that divides a cavity within the pressure sensor. The pressure sensor includes a port. The port is in fluid communication with the venting tube.

In some aspects, the cable jacket has an average thickness and the inner layer has an average thickness. The average thickness of the cable jacket is less than the average thickness of the inner layer.

In some aspects, the non-hygroscopic polymer comprises at least one of polyethylene (PE), polyethylene ultra-high molecular weight (PE-UHMW), high-density polyethylene (HDPE), low-density polyethylene (LDPE), linear low-density polyethylene (LLDPE), crosslinked polyethylene (XLPE), flexible polyvinylchlorine (PVC), polypropylene, ethylene tetrafluoroethylene (ETFE), or polyoxymethylene homopolymer, ethylene vinyl acetate, polytetrafluoroethylene.

In some aspects, the cable jacket comprises at least one of polyurethane, polyamide (PA), acrylonitrile butadiine styrene, polymethylmethacrylate (acrylic), fluorinated ethylene propylene, polybutylene terephthalate, polycarbonate, cellulose acetate butyrate, or cellulose acetate propionate, polyethylene terephthalate, polyphenylene oxide, styrene acrylonitrile, polysulfone, ethylene tetrafluoroethylene (ETFE), or polyetherimide.

In one or more embodiments, a submersible cable is provided that includes electrical conductors, a venting tube, a cable jacket, and an inner layer that is surrounded by the cable jacket. The inner layer surrounds the electrical conductors and the venting tube. The inner layer includes a non-hygroscopic polymer that is more resistant to absorbing an aqueous liquid than the cable jacket. A water-absorption percentage of the non-hygroscopic polymer is at most 0.01% and a water-absorption percentage of the cable jacket is at least 0.1%.

The water-absorption percentage can be determined using International Organization for Standardization (ISO) 62:2008 or ASTM D570-98(2010)e1.

In particular embodiments, the inner layer is a first sub-layer and the cable jacket is a second sub-layer. The first and second sub-layers form a co-extruded layer in which the first and second sub-layers are distinct but inseparable portions of the co-extruded layer.

In some aspects, the electrical conductors are distributed circumferentially about the venting tube.

In some aspects, the submersible cable also includes a shielding layer that surrounds and groups together the electrical conductors and the venting tube. The co-extruded layer surrounds the shielding layer.

In some aspects, the cable jacket comprises polyurethane and has an exterior matte finish.

In some aspects, the non-hygroscopic polymer comprises at least one of polyethylene (PE), polyethylene ultra-high molecular weight (PE-UHMW), high-density polyethylene (HDPE), low-density polyethylene (LDPE), linear low-density polyethylene (LLDPE), crosslinked polyethylene (XLPE), flexible polyvinylchloride (PVC), polypropylene, ethylene tetrafluoroethylene (ETFE), or polyoxymethylene homopolymer, ethylene vinyl acetate, polytetrafluoroethylene.

In some aspects, the cable jacket has an average thickness and the inner layer has an average thickness. The average thickness of the cable jacket is less than the average thickness of the inner layer.

In one or more embodiments, a submersible transducer is provided that includes a transducer housing configured to be submerged within a designated liquid. The submersible transducer also includes a sensor disposed within the transducer housing and operable to obtain data for determining a parameter of the designated liquid. The submersible cable has electrical conductors operably coupled to the sensor. The submersible cable also includes a cable jacket and an inner layer that is surrounded by the cable jacket. The inner layer comprises a polymer that is more resistant to absorbing the designated liquid than the cable jacket, wherein a liquid-absorption percentage of the cable jacket is at least ten times (10×) a liquid-absorption percentage of the polymer of the inner layer.

The liquid-absorption percentage can be determined using tests consistent with the International Organization for Standardization (ISO) 62:2008 or ASTM D570-98(2010)e1 with respect to water absorption, except that the designated liquid may replace water.

In certain embodiments, the inner layer is a first sub-layer and the cable jacket is a second sub-layer. The first and second sub-layers form a co-extruded layer in which the first and second sub-layers are distinct but inseparable portions of the co-extruded layer.

In some aspects, the cable jacket has an average thickness and the inner layer has an average thickness. The average thickness of the cable jacket is less than the average thickness of the inner layer.

In some aspects the submersible transducer also includes a venting tube and a shielding layer that surrounds and groups together the electrical conductors and the venting tube. A central axis of the submersible cable extends through a passage of the venting tube.

When comparing the water-absorption percentages or the liquid-absorption percentages, the percentages may be determined using International Organization for Standardization (ISO) 62:2008, ASTM D570-98(2010)e1, or another test, provided that the two layers are subjected to the same test. For example, the test may include submerging the inner layer and submerging the outer layer within the designated liquid, at a common depth, at a common temperature, and for the same duration. The duration could be one hour, two hours, six hours, 12 hours, 24 hours, 48 hours, a week or more.

DETAILED DESCRIPTION

Figure 1:
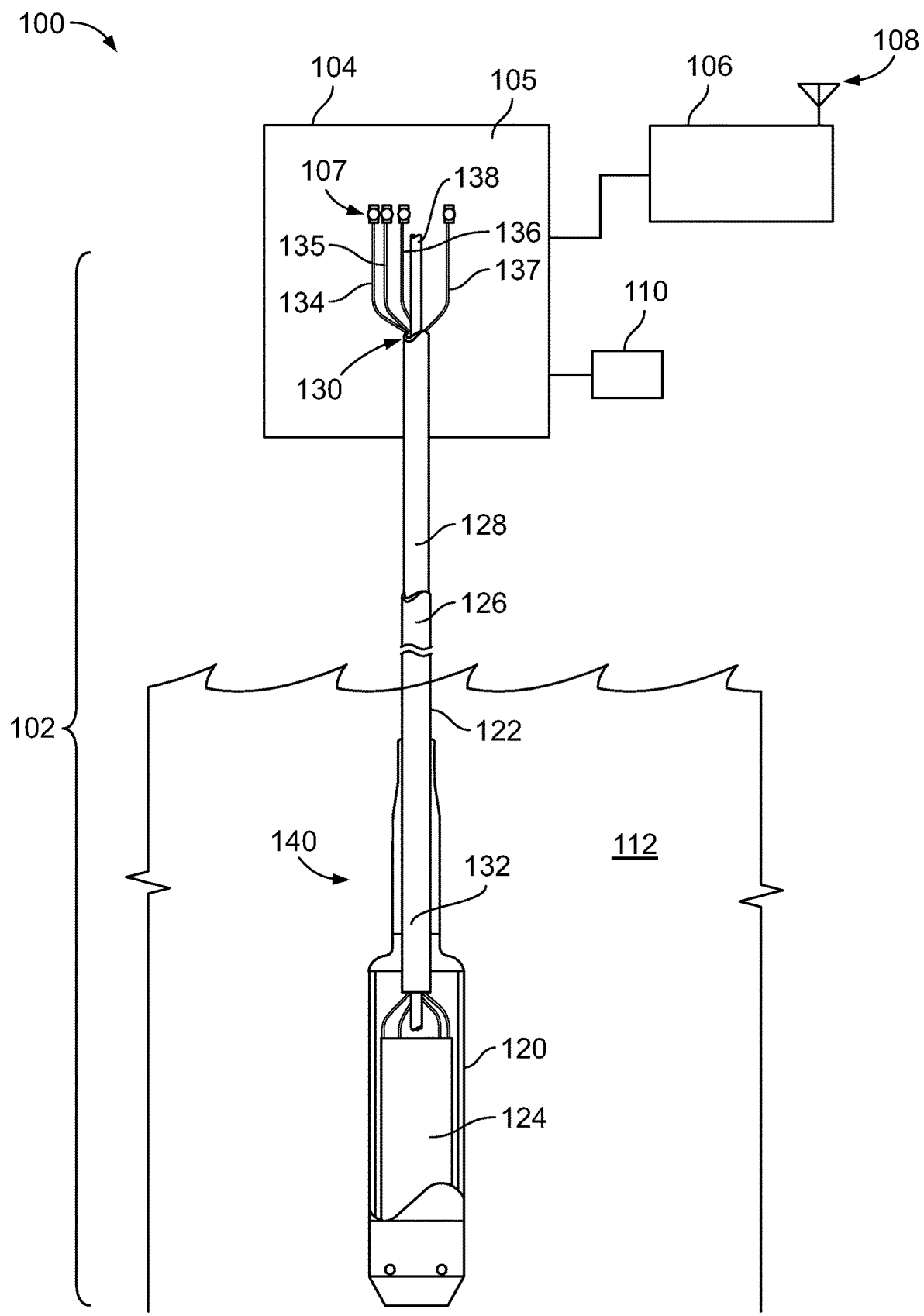
FIG. 1 is a schematic view of a submersible transducer in accordance with an embodiment.

Embodiments set forth herein include submersible transducers and monitoring systems having the same. The submersible transducer is configured to be fully submerged within a liquid to obtain information relating to the liquid. Depending upon the application, submersible transducers may remain submerged within the liquid for several minutes, hours, days, weeks, months, or years. The submersible transducers may be located at depth between 0 and 350 meters. Particular embodiments may be operable at even greater depths, such as up to 3000 meters.

In some embodiments, the submersible transducers are pressure transducers that obtain measurands that directly correlate to or may be used to calculate a pressure of the liquid. Alternatively or in addition to determining pressure, the submersible transducer may obtain measurands that directly correlate to or may be used to calculate a temperature of the liquid and/or a conductivity of the liquid and/or another parameter.

In particular embodiments, the submersible pressure transducers are vented gage transducers used to determine a level of the liquid. Such transducers include a venting tube for determining an atmospheric pressure. The atmospheric pressure may be used as a reference point to determine the level of the water.

Embodiments include a transducer housing and at least one sensor that is located within the housing and protected from the surrounding liquid. For embodiments in which the parameter-of-interest is pressure, the submersible transducer typically includes a diaphragm. The sensor is connected to the external environment through a submersible cable.

Like the transducer housing, the submersible cable is designed to be submerged within a liquid for an extended period of time. As described herein, embodiments have a cable jacket and an inner layer surrounded by the cable jacket. The inner layer may surround longitudinal elements (e.g., insulated conductors, venting tubes, drain wires, and fillers). Optionally, embodiments may include other layers, such as a shielding layer that surrounds electrical conductors or another polymer layer that is desired for different properties.

As used herein, the term "layer" includes, for example, homogenous compositions and heterogeneous compositions. A homogenous layer may, for example, consist essentially of polyurethane with one or more optional agents. A heterogeneous layer may, for example, consist essentially of a polymer material having one or more fibers or particles dispersed therein.

As used herein, a layer may "surround" another layer or longitudinal elements without contacting the other layer or the longitudinal elements. For example, an outer layer may immediately surround the inner layer, but the outer layer also surrounds the longitudinal elements that are surrounded by the inner layer. When a layer "immediately surrounds" another element or group of elements (e.g., conductors), there is no other intervening element in between. A layer that immediately surrounds another layer may be intimately engaged to the other layer.

Certain embodiments may be used for hydrostatic environmental water monitoring. Submersible pressure transducers currently in use today typically use polyurethane cable jackets. Over time the polyurethane cable jackets may become saturated and allow moisture to slowly migrate into the transducer housing. If the moisture migrates into a reference cavity that is in fluid communication with the venting tube, the measurements may be incorrect. Some cable jackets also include material to create an outer matte finish for ease of small-bore installation, which typically increases water absorption even more.

Embodiments may impede liquid penetration, thereby increasing the lifetime operation or life span of the submersible transducers by weeks, months, or years. Although the following description is with particular reference to the liquid being water, the liquid may be other types of liquid (e.g., industrial chemicals, natural gas liquids, corn oil, etc.) and the submersible cable and transducer housing may be modified based on the type of liquid being monitored.

For example, the cable jacket may be configured to have certain designated properties, and the inner layer may be configured to have other designated properties. In some embodiments, the cable jacket may be compatible with existing cable applications and accessories and compatible with intermediate processes used when manufacturing the submersible transducer. As one specific example, the cable jacket may comprise polyurethane having an exterior matte finish. Such cable jackets may be compatible with existing over-mold processes and cable glands.

The inner layer may comprise a material that is selected to impede absorption of the designated liquid. For example, the inner layer may comprise a non-hygroscopic polymer that resists water absorption. However, it should be understood that the polymer may be selected to impede absorption of other designated liquids, which may or may not include water.

Liquid absorption may be determined using one or more established and/or industry-accepted technical standards for water absorption, such as International Organization for Standardization (ISO) 62:2008 and ASTM D570-98(2010) e1. If either of the standards require, parameters may be selected based on the conditions that the submersible transducer is expected to experience in operation. Such parameters may include humidity of external environment, temperature of liquid or environment, duration of immersion, and the like. It is not necessary for the testing parameters to match real-life conditions (e.g., immersion duration). Instead, the testing parameters are selected to obtain data for inferring how the submersible transducer may operate in the course of normal usage.

When comparing the water-absorption percentages or the liquid-absorption percentages (e.g., to determine if one percentage is at least 10× the other percentage), the percentages may be determined using the International Organization for Standardization (ISO) 62:2008, the ASTM D570-98(2010)e1, or another test, provided that the two layers are subjected to the same test. For example, the test may include submerging the inner layer and submerging the outer layer within the designated liquid, at a common depth, at a common temperature, and for the same duration. The duration could be one hour, two hours, six hours, 12 hours, 24 hours, 48 hours, a week or more. For instance, the inner layer and the outer layer can be placed at the bottom of the same tank for one week. The two layers may then be tested to determine the respective liquid-absorption percentages. The two values could then be compared to determine if, for example, one value is more than 10 times (10×) the other value.

By way of example, a water-absorption percentage may be obtained in accordance with ASTM D570-98(2010)e1 when a specimen of the layer is submerged in distilled water at 23° C. for two weeks (14 days). As another example, a water-absorption percentage may be obtained in accordance with ASTM D570-98(2010)e1 when a specimen of the layer is submerged in distilled water at 23° C. for sixty (60) days. As another example, the water-absorption percentage may be obtained in accordance with ASTM D570-98(2010)e1 when a specimen of the layer is submerged in distilled water at 23° C. until saturation. The layers used as test specimens have the same compositions as the layers (e.g., inner and outer layers) in the submersible cable. The specimens may be, for example, a disk having a designated thickness (e.g., between 0.2 mm and 1.0 mm).

In some embodiments, the polymer of the inner layer is non-hygroscopic and has a liquid-absorption percentage that is at most 0.1%. In certain embodiments, the non-hygroscopic polymer has a liquid-absorption percentage that is at most 0.05%. In particular embodiments, the non-hygroscopic polymer has a liquid-absorption percentage that is at most 0.03%. In more particular embodiments, the non-hygroscopic polymer has a liquid-absorption percentage that is at most 0.01%.

In some embodiments, the polymer of the cable jacket has a liquid-absorption percentage that is at least 1.0%. In certain embodiments, the cable jacket has a liquid-absorption percentage that is at least 0.5%. In particular embodiments, the cable jacket has a liquid-absorption percentage that is at least 0.1%.

In some embodiments, a liquid-absorption percentage of the cable jacket is at least ten times (10×) a liquid-absorption percentage of the polymer of the inner layer. In certain embodiments, a liquid-absorption percentage of the cable jacket is at least twenty-five times (25×) a liquid-absorption percentage of the polymer of the inner layer. In some embodiments, a liquid-absorption percentage of the cable jacket is at least fifty times (50×) a liquid-absorption percentage of the polymer of the inner layer.

Non-limiting examples of the polymer of the inner layer include polyethylene (PE), polyethylene ultra-high molecular weight (PE-UHMW), high-density polyethylene (HDPE), low-density polyethylene (LDPE), linear low-density polyethylene (LLDPE), crosslinked polyethylene (XLPE), flexible polyvinylchloride (PVC), polypropylene, polyoxymethylene homopolymer, ethylene vinyl acetate, or polytetrafluoroethylene. In particular embodiments, the inner layer may consist essentially of one or more of the polymers listed above. In more particular embodiments, the inner layer may consist of one or more of the polymers listed above.

Non-limiting examples of a polymer for the cable jacket include polyurethane, polyamide (PA), acrylonitrile butadiine styrene, polymethylmethacrylate (acrylic), fluorinated ethylene propylene, polybutylene terephthalate, polycarbonate, cellulose acetate butyrate, or cellulose acetate propionate, polyethylene terephthalate, polyphenylene oxide, styrene acrylonitrile, polysulfone, or polyetherimide. In particular embodiments, the cable jacket may consist essentially of one or more of the polymers listed above. In more particular embodiments, the cable jacket may consist of one or more of the polymers listed above.

Optionally, embodiments may utilize a cable-gland seal that surrounds and compresses the cable and the transducer housing where the two connect. The cable-gland seal may include, for example, a grommet and a collet that clamp onto the cable. Cable-gland seals may be less expensive than the over-molded strain-relief sections. In some embodiments, the inner layer (e.g., polyethylene) may provide a more firm and concentric cable, thereby enabling a better seal between the cable-gland seal and the cable. Some embodiments may include ethylene tetrafluoroethylene (ETFE) as the inner layer or as the cable jacket. Cable-gland seals may be more appropriate for ETFE cable jackets.

FIG. 1 is a schematic view of a submersible transducer 102 in accordance with an embodiment. The submersible transducer 102 forms part of a monitoring system 100 that may include a system terminal 104 and, optionally, a computing system 106, wireless transmitter 108, and a power source 110. The system terminal 104 may include, for example, an enclosure 105 and a plurality of electrical terminals 107. The computing system 106 may obtain and process measurements that are communicated through the system terminal 104 from the submersible transducer 102. The computing system 106 may wirelessly communicate information based upon the measurements through the wireless transmitter 108 (e.g., antenna). In particular embodiments, the measurements correlate to a pressure of a designated liquid 112 and the information relates to a level or volume of the designated liquid 112. In other embodiments, however, the measurements and information may correlate to other parameters.

The designated liquid 112 may be any liquid that is desired to be monitored. In the illustrated embodiment, the designated liquid 112 is ground-water, waste-water, or surface-water and is stored within a tank or aquifer or is flowing within a river or lake. In other embodiments, however, the designated liquid 112 may be another type of liquid and/or may be contained in another manner.

As shown, the submersible transducer 102 includes a transducer housing 120 and a submersible cable 122 that is operably connected to the transducer housing 120. The submersible transducer 102 also includes a sensor 124 that is stored within the transducer housing 120. The sensor 124 detects data that may be used to determine a parameter-of-interest. In particular embodiments, the sensor 124 is a device that converts energy from one form to another. For example, the sensor 124 may be a pressure sensor that measures changes in pressure. The sensor 124 may include a mechanical-transduction element (not shown) or force-summing device (not shown) that is coupled to an active or passive electrical-transduction element (not shown). The electrical-transduction element converts mechanical energy into electrical energy and the mechanical-transduction element converts gas or liquid energy into mechanical energy. The pressure sensor may be, for example, a strain-gage transducer, a piezoelectric transducer, a capacitive transducer, an inductive or reductive transducer, or a potentiometric transducer.

The submersible cable 122 extends between a terminal end 130 and a connecting end portion 132. The submersible cable 122 includes a cable jacket 126 and an inner layer 128 that is surrounded by the cable jacket 126. As shown in FIG. 1, the submersible cable 122 has a plurality of electrical conductors 134-137 and a venting tube 138 that are surrounded by the inner layer 128 and by the cable jacket 126. The electrical conductors 134-137 and the venting tube 138 exit the submersible cable 122 at the terminal end 130. In the illustrated embodiment, each of the electrical conductors is an insulated wire having a wire conductor surrounded by an insulation layer. It is contemplated that other types of wires may be, such as twisted pairs, parallel pairs (e.g., twin-axial), and the like.

The electrical conductors 134-137 are operably connected to the sensor 124 within the transducer housing 120, and the venting tube 138 is in fluid communication with a reference cavity. The venting tube 138 has a passage 139 (shown in FIG. 2) that fluidly connects the sensor 124 and ambient air of the external environment so that an atmospheric pressure may be used to determine a pressure within the designated liquid 112.

Optionally, the submersible transducer 102 includes a strain-relief section 140 that covers a portion of the transducer housing 120 and a portion of the cable jacket 126. As described herein, the cable jacket 126 may comprise a material that is compatible with processes that provide the strain-relief section 140. For example, the strain-relief section 140 may be made during an over-molding process.

Figures 2, 3:
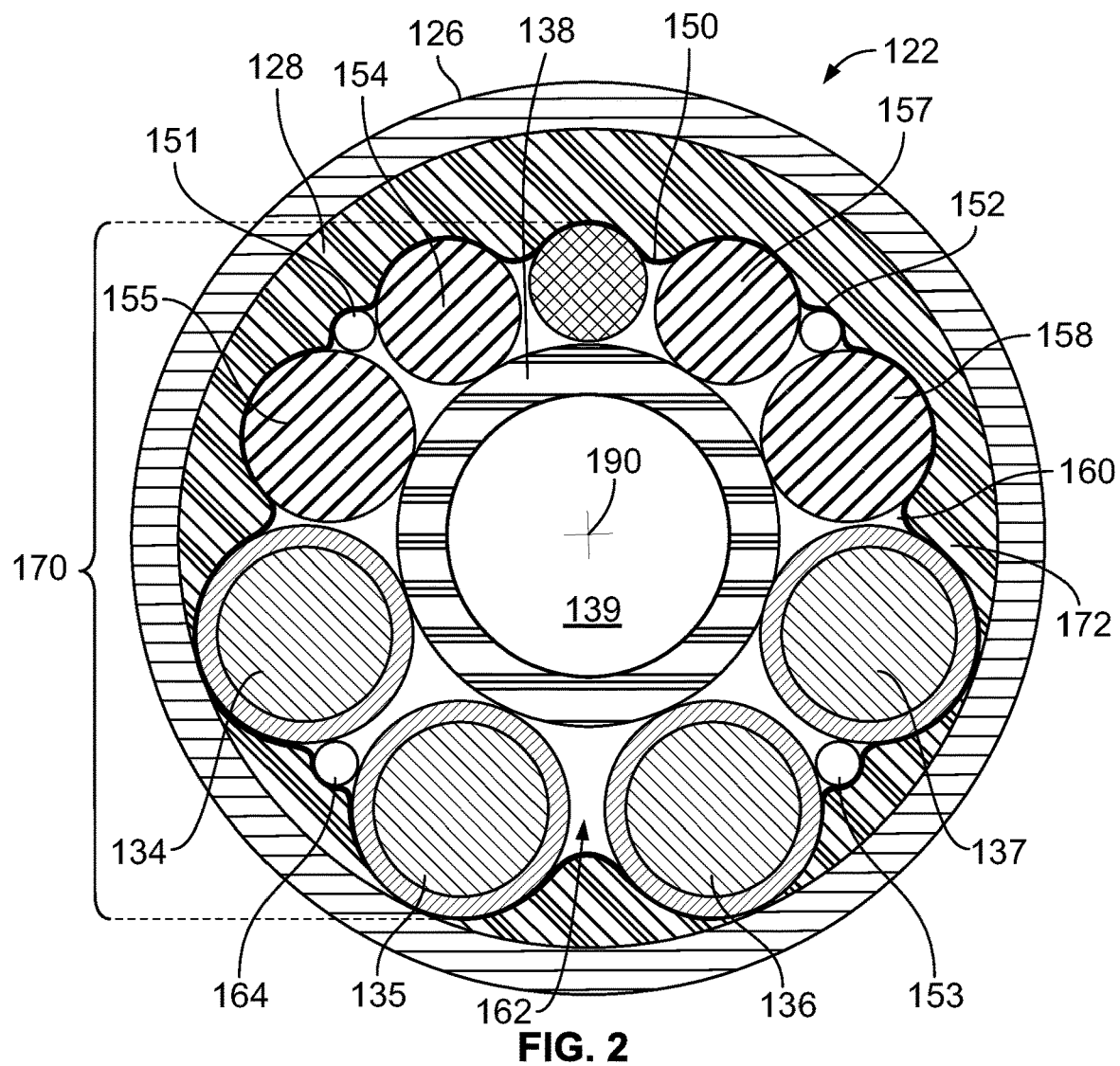
FIG. 2 is a cross-section of a cable that may be used with the submersible transducer of FIG. 1.
FIG. 3 is a cross-sectional view of a die head that may be used to form a co-extruded layer in accordance with an embodiment.

FIG. 2 is a cross-section of the submersible cable 122. As shown, the cable jacket 126 surrounds the inner layer 128. The inner layer 128 surrounds the electrical conductors 134-137 and the venting tube 138. In the illustrated embodiment, the inner layer 128 also surrounds a drain wire 150 and a plurality of stiffening elements 151-158.

The venting tube 138 defines a passage 139. In the illustrated embodiment, the passage 139 coincides with a central axis 190 of the submersible cable 122. The longitudinal elements of the submersible cable 122 may be distributed about the venting tube 138. For example, the electrical conductors 134-137, the drain wire 150, and the stiffening elements 151-158 are distributed circumferentially about the venting tube 138 and positioned against an exterior surface of the venting tube 138. Optionally, the longitudinal elements may be helically wrapped about the venting tube 138.

The submersible cable 122 may also include a shielding layer 160 that surrounds the longitudinal elements 134-137 and 150-158 and the venting tube 138. The shielding layer 160 may include a conductive material that shields the electrical conductors 134-137 from electrical crosstalk. The shielding layer 160 may be, for example, a conductive tape having a conductive layer (e.g., foil) on one or both sides of the tape. The shielding layer 160 may be helically wrapped about the central axis 190.

In the illustrated embodiment, the shielding layer 160 surrounds and groups together the electrical conductors 134-137 and the venting tube 138. The shielding layer 160 also surrounds the longitudinal elements 150-158. Accordingly, the electrical conductors 134-137, the venting tube 138, and the longitudinal elements 150-158 may be surrounded by the same shielding layer 160 and held together. When grouped together by the shielding layer 160, the electrical conductors 134-137, the venting tube 138, and the longitudinal elements 150-158 may be characterized as being bundled or being a cable bundle 170. As shown, the shielding layer 160 follows the contours of the bundled longitudinal elements 134-137 and 150-158. The inner layer 128 extends partially between gaps that are formed by adjacent longitudinal elements. An empty space 162 may exist between the shielding layer 160 and the venting tube 138.

FIG. 3 is a schematic view of a co-extrusion system 200. The co-extrusion system 200 includes a die 202 and multiple hoppers 204, 206. The hoppers 204, 206 are configured to receive solid polymeric material (pellets) that is fed into a screw within a barrel (not shown). The screw mechanically shears and generates friction, thereby melting the polymeric material. For example, the hopper 204 includes the material used to form the inner layer 128 (FIG. 1), and the hopper 206 includes the material used to form the cable jacket 126 (FIG. 1). The die 202 includes channels 214, 216 that direct the melted material to flow onto the cable at different stages. In the illustrated embodiment, the cable bundle 170 is being fed through a passage 220 of the die 202. The melted material flowing through the channel 214 coats the cable bundle 170. After the cable at least partially cools or solidifies, the melted material from the channel 216 coats the coated cable bundle.

The timing, heat, and pressure of the co-extrusion process for an intimate engagement of the different layers. As such, and with reference to FIG. 2, the inner layer 128 may form a first sub-layer of a co-extruded layer 172 and the cable jacket 126 may form a second sub-layer of the co-extruded layer 172. The first and second sub-layers combine to form the co-extruded layer 172. The first and second sub-layers are distinct portions of the co-extruded layer 172. For example, the first and second sub-layers may be identified by, for example, cutting the submersible cable 122 perpendicular to the central axis 190. Nevertheless, the first and second sub-layers are inseparable portions of the co-extruded layer 172 such that the first and second sub-layers form a single layer that surrounds the cable bundle 170. The first and second sub-layers could not be separated without permanently damaging the co-extruded layer 172. Accordingly, in some embodiments, the first and second sub-layers 126, 128 form the co-extruded layer 172 in which the first and second sub-layers 126, 128 are distinct but inseparable portions of the co-extruded layer 172.

The cable jacket 126 has an average thickness and the inner layer 128 has an average thickness. In some embodiments, the average thickness of the cable jacket 126 is less than the average thickness of the inner layer 128. For example, the cable jacket 126 may have an average thickness that is between 0.18 millimeters (mm) and 0.30 mm. In more particular embodiments, the cable jacket 126 may have an average thickness that is between 0.20 mm and 0.24 mm. The inner layer 128 may have an average thickness that is between 0.60 mm and 0.80 mm. In more particular embodiments, the cable jacket 126 may have an average thickness that is between 0.66 mm and 0.74 mm. The "average thickness" may be determined by examining one or more representative segments of the submersible cable having a designated length (e.g., ten (10) three-centimeter segments that are evenly distributed along the submersible cable).

Although the above description relates to two sub-layers being co-extruded, it is contemplated that embodiments may include three or more sub-layers that form a co-extruded layer. A third sub-layer could be intimately engaged to the second sub-layer using, for example, a third hopper and a third channel. In such embodiments, the first, second, and third sub-layers may be inseparable portions of the co-extruded layer such that the first, second, and third sub-layers form a single layer that surrounds the cable bundle. The third sub-layer may provide other properties for the submersible cable.

Figure 4:
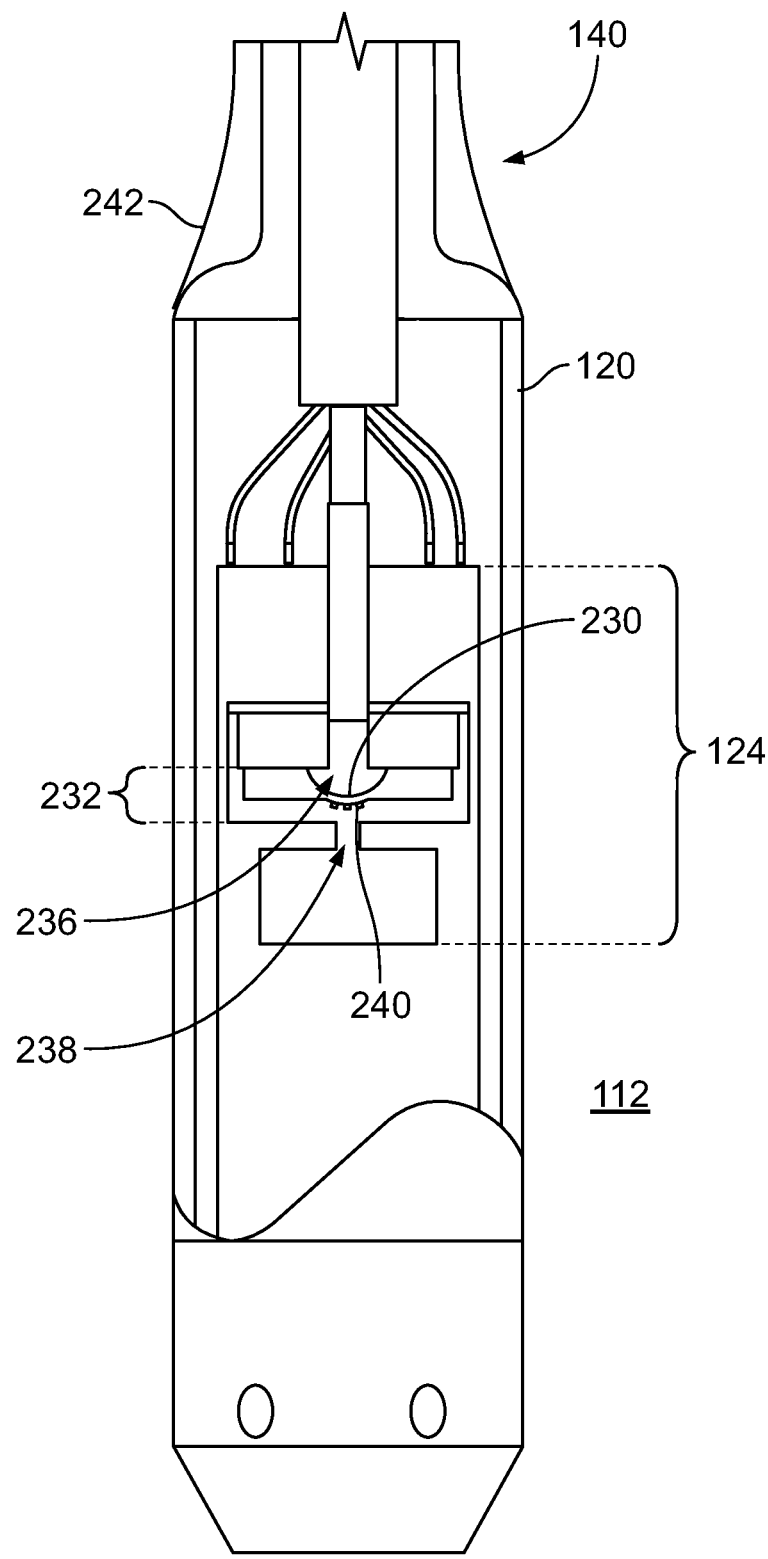
FIG. 4 is an enlarged schematic view of a transducer housing and a parameter sensor disposed within the transducer housing that may be used by the submersible transducer of FIG. 1.

FIG. 4 is an enlarged schematic view of the transducer housing 120 and the sensor 124 disposed within the transducer housing 120. In the illustrated embodiment, the sensor 124 includes a diaphragm 230 that divides a cavity 232 within the sensor 124. The sensor 124 includes a port 236 that is in fluid communication with the venting tube 138 and a port 238. The port 238 is in fluid communication with a space that experiences the pressure of the designated liquid 112. During operation, the diaphragm 230 flexes based upon the difference between the atmospheric pressure and the liquid pressure.

In the illustrated embodiment, the sensor 124 includes piezo-resistive elements 240. The piezo-resistive elements 240 may be connected in a Wheatstone Bridge configuration. As the pressure difference varies, the diaphragm 230 flexes, thereby changing relative positions and/or strain of the piezo-resistive elements 240, and a varying differential voltage output is generated. The differential voltage may be communicated to the computing system 106 (FIG. 1). Alternatively, the signals may be pre-processed within the sensor 124 prior to communicating the information to the computing system 106.

Also shown, the transducer housing 120 is coupled to an end cap 242 that covers an opening to the transducer housing 120. The end cap 242 may enhance the structural integrity of the transducer housing 120 and protect the sensor 124. The strain-relief section 140 surrounds the end cap 242. The strain-relief section 140 may be an over-mold having the same or similar material as the cable jacket 126. In the illustrated embodiment, the strain-relief section 140 includes polyurethane.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

What is claimed is:

1. A submersible transducer comprising:
    a transducer housing configured to be submerged within an aqueous liquid;
    a pressure sensor operable to obtain data for determining a pressure of the aqueous liquid; and
    a submersible cable having an electrical conductor and a venting tube operably coupled to the pressure sensor, the pressure sensor using an atmospheric pressure of an external environment that is detected through the venting tube to determine the pressure of the aqueous liquid, the submersible cable also including a cable jacket and an inner layer that is surrounded by the cable jacket, the inner layer surrounding the electrical conductor and the venting tube, wherein an empty space exists within the cable along an outside surface of the venting tube, wherein the inner layer comprises a non-hygroscopic polymer that is more resistant to absorbing the aqueous liquid than the cable jacket.

2. The submersible transducer of claim 1, wherein a water-absorption percentage of the non-hygroscopic polymer is at most 0.01% and a water-absorption percentage of the cable jacket is at least 0.1%, the water-absorption percentages being determined in accordance with ASTM D570-98(2010)e1 in which specimens of the inner and outer layers are submerged in distilled water at 23° C. until saturation.

3. The submersible transducer of claim 1, wherein a water-absorption percentage of the cable jacket is at least ten times (10×) a water-absorption percentage of the non-hygroscopic polymer.

4. The submersible transducer of claim 1, wherein the inner layer is a first sub-layer and the cable jacket is a second sub-layer, the first and second sub-layers forming a co-extruded layer in which the first and second sub-layers are distinct but inseparable portions of the co-extruded layer.

5. The submersible transducer of claim 1, wherein the cable jacket comprises polyurethane and has an exterior matte finish.

6. The submersible transducer of claim 1, wherein the electrical conductor is one of a plurality of the electrical conductors, the electrical conductors being distributed circumferentially about the venting tube, the submersible transducer further comprising a shielding layer that surrounds and groups together the electrical conductors and the venting tube.

7. The submersible transducer of claim 1, further comprising a strain-relief section that covers a portion of the transducer housing and the cable jacket.

8. The submersible transducer of claim 1, wherein the pressure sensor includes a diaphragm that divides a cavity within the pressure sensor, the pressure sensor including a port, the port being in fluid communication with the venting tube.

9. The submersible transducer of claim 1, wherein the cable jacket has an average thickness and the inner layer has an average thickness, the average thickness of the cable jacket being less than the average thickness of the inner layer.

10. The submersible transducer of claim 1, wherein the non-hygroscopic polymer comprises at least one of polyethylene (PE), polyethylene ultra-high molecular weight (PE-UHMW), high-density polyethylene (HDPE), low-density polyethylene (LDPE), linear low-density polyethylene (LL-DPE), crosslinked polyethylene (XLPE), flexible polyvinylchloride (PVC), polypropylene, ethylene tetrafluoroethylene (ETFE), or polyoxymethylene homopolymer, ethylene vinyl acetate, polytetrafluoroethylene.

11. The submersible transducer of claim 1, wherein the cable jacket comprises at least one of polyurethane, polyamide (PA), acrylonitrile butadiine styrene, polymethylmethacrylate (acrylic), fluorinated ethylene propylene, polybutylene terephthalate, polycarbonate, cellulose acetate butyrate, or cellulose acetate propionate, polyethylene terephthalate, polyphenylene oxide, styrene acrylonitrile, polysulfone, ethylene tetrafluoroethylene (ETFE), or polyetherimide.

12. A submersible cable comprising:
    electrical conductors;
    a venting tube;
    a cable jacket; and
    an inner layer that is surrounded by the cable jacket, wherein the electrical conductors are positioned around the venting tube, wherein the inner layer surrounds the electrical conductors, wherein an empty space exists within the cable along an outside surface of the venting tube, wherein the inner layer comprises a non-hygroscopic polymer that is more resistant to absorbing an aqueous liquid than the cable jacket.

13. The submersible cable of claim 12, wherein a water-absorption percentage of the non-hygroscopic polymer is at most 0.03% and a water-absorption percentage of the cable jacket is at least 0.1%, the water-absorption percentages being determined in accordance with ASTM D570-98(2010) e1 in which specimens of the inner and outer layers are submerged in distilled water at 23° C. until saturation.

14. The submersible cable of claim 12, further comprising a shielding layer that surrounds and groups together the electrical conductors and the venting tube, the inner layer surrounding the shielding layer.

15. The submersible cable of claim 12, wherein the cable jacket comprises polyurethane and has an exterior matte finish.

16. The submersible cable of claim 12, wherein the non-hygroscopic polymer comprises at least one of polyethylene (PE), polyethylene ultra-high molecular weight (PE-UHMW), high-density polyethylene (HDPE), low-density polyethylene (LDPE), linear low-density polyethylene (LL-DPE), crosslinked polyethylene (XLPE), flexible polyvinylchloride (PVC), polypropylene, ethylene tetrafluoroethylene (ETFE), or polyoxymethylene homopolymer, ethylene vinyl acetate, polytetrafluoroethylene.

17. The submersible cable of claim 12, wherein the cable jacket has an average thickness and the inner layer has an average thickness, the average thickness of the cable jacket being less than the average thickness of the inner layer.

18. A submersible transducer comprising:
a transducer housing configured to be submerged within a designated liquid;
a sensor disposed within the transducer housing and operable to obtain data for determining a parameter of the designated liquid; and
a submersible cable having electrical conductors disposed within the cable and operably coupled to the sensor, the submersible cable also including a cable jacket and an inner layer that is surrounded by the cable jacket, wherein the electrical conductors are bundled together and the inner layer is disposed only along an external region of the bundled electrical conductors, wherein the inner layer comprises a polymer that is more resistant to absorbing the designated liquid than the cable jacket, wherein a liquid-absorption percentage of the cable jacket is at least ten times (10×) a liquid-absorption percentage of the polymer of the inner layer;

wherein the inner layer is a first sub-layer and the cable jacket is a second sub-layer, the first and second sub-layers forming a co-extruded layer in which the first and second sub-layers are distinct but inseparable portions of the co-extruded layer.

19. The submersible transducer of claim 18, wherein the cable jacket has an average thickness and the inner layer has an average thickness, the average thickness of the cable jacket being less than the average thickness of the inner layer.

20. The submersible transducer of claim 18, further comprising a venting tube and a shielding layer, wherein the shielding layer surrounds and groups together the bundled electrical conductors and the venting tube, and wherein a central axis of the submersible cable extends through a passage of the venting tube.

* * * * *